United States Patent
Shimada et al.

(12) 
(10) Patent No.: US 6,376,592 B1
(45) Date of Patent: Apr. 23, 2002

(54) WATER DISPERSION TYPE WATER AND OIL REPELLENT COMPOSITION

(75) Inventors: Toyomichi Shimada; Takashige Maekawa, both of Yokohama (JP)

(73) Assignee: Asahi Glass Company, Ltd., Tokyo (JP)

( * ) Notice: Subject to any disclaimer, the term of this patent is extended or adjusted under 35 U.S.C. 154(b) by 0 days.

(21) Appl. No.: 09/372,607

(22) Filed: Aug. 12, 1999

(30) Foreign Application Priority Data

Aug. 24, 1998 (JP) .......................................... 10-237683
Jun. 16, 1999 (JP) .......................................... 11-169938

(51) Int. Cl.$^7$ .................... C09D 127/12; C09D 175/00; D06M 15/256; D06M 15/564; C08L 27/12

(52) U.S. Cl. ...................... 524/457; 8/115.64; 8/115.67; 8/192; 428/374; 428/375; 428/378; 428/423.1; 524/197; 524/198; 524/200; 524/507; 524/544; 524/589; 524/591; 524/805; 524/839; 524/728; 526/242; 526/301; 526/312; 528/45; 528/70; 525/124

(58) Field of Search ........................... 8/115.64, 115.67, 8/192; 428/374, 375, 378, 423.1; 524/507, 544, 589, 591, 839, 805, 457–728, 197, 198, 200; 526/242, 301, 312; 528/45, 70; 525/124

(56) References Cited

U.S. PATENT DOCUMENTS 4,859,754 A     8/1989  Maekawa et al. ........... 526/245
5,100,954 A     3/1992  Itoh et al. .................... 524/805
5,548,019 A  *  8/1996  Kawakami et al. .......... 524/591
5,565,607 A    10/1996  Maekawa et al. ........... 560/223
5,646,222 A     7/1997  Maekawa et al. ........... 526/243
5,876,617 A     3/1999  Sato et al. .................. 252/8.62
5,910,557 A  *  6/1999  Audenaert et al. ............ 528/70
6,177,531 B1 *  1/2001  Shimada et al. ............. 526/245
6,207,777 B1 *  3/2001  Shimada et al. ............. 526/245
6,261,695 B1 *  7/2001  Kirimoto ................... 428/423.7
6,271,283 B1 *  8/2001  Shimada et al. ............. 523/122

FOREIGN PATENT DOCUMENTS

JP          61-019684       1/1986
WO          WO 92/17636    10/1992
WO          WO 97/37076    10/1997

OTHER PUBLICATIONS

Patent Abstracts of Japan, vol. 1997, No. 03, Mar. 31, 1997, JP 08 296175, Nov. 12, 1996.
Patent Abstracts of Japan, vol. 1995, No. 02, Mar. 31, 1995, JP 06 316869, Nov. 15, 1994.

* cited by examiner

*Primary Examiner*—Rabon Sergent
(74) *Attorney, Agent, or Firm*—Oblon, Spivak, McClelland, Maier & Neustadt, P.C.

(57) ABSTRACT

A water dispersion type water and oil repellent composition obtained by polymerizing the following polymerizable monomer mixture (b) in the presence of a compound (a) having a blocked isocyanate group and no polymerizable unsaturated group:

(b) a mixture comprising a polymerizable monomer having a polyfluoroalkyl group and a polymerizable monomer having no polyfluoroalkyl group.

20 Claims, No Drawings

WATER DISPERSION TYPE WATER AND OIL REPELLENT COMPOSITION

The present invention relates to a water dispersion type water and oil repellent composition which provides soft handling during treatment and which is capable of imparting practical water and oil repellency excellent in durability against washing, dry cleaning and abrasion.

Heretofore, a technique has been known to treat e.g. a fiber product with a polymer comprising, as constituting units, a polymerizable monomer having a polyfluoroalkyl group (hereinafter referred to as a $R^f$ group) or a compound having a $R^f$ group in the form of an organic solvent solution or an aqueous solvent dispersion to impart water and oil repellency to its surface.

In order to improve durability of water and oil repellency against washing or dry cleaning, it has been attempted to copolymerize a polymerizable monomer having a $R^f$ group with a polymerizable monomer having a bonding group, to blend a polymer having a $R^f$ group with a polymer having a high coating film strength, or to change the polymerization method.

Further, it is also known to improve the durability by adding a separate water-soluble or water-dispersible crosslinking agent (such as a melamine resin or a blocked urethane resin) during treatment of the fiber with a polymer dispersion, to increase the adhesion between the fiber and the polymer, and it has been confirmed that such a method is effective for improvement of the durability. However, by this method, it is required to add a large amount of a crosslinking agent in order to obtain adequate durability, and in such a case, there has been a problem that hand tends to be hard.

With conventional water and oil repellent compositions and water and oil repellent treatments, the durability against washing or dry cleaning, of the water and oil repellency imparted to common clothings, has been generally satisfactory. However, for clothings such as sports wears or mountaineering wears for which still higher water and oil repellency is required, the practical durability functions, i.e. durability against washing or dry cleaning, durability against abrasion and durability against hydrostatic head, of the water and oil repellency, have been inadequate.

Especially when polyamide fibers having a relatively high hydrophilicity, very fine synthetic fibers with a fiber diameter of at most 10 μm or fibers having a special surface shape such as modified cross-section yarns or new synthetic fibers (split yarns), are treated for water and oil repellency, the water and oil repellency or the hydrostatic head tend to remarkably decrease by a few times of washing and dry cleaning or by abrasion during wearing, such being practically problematic. Further, a large amount of crosslinking agent has been required to be added later, such being unsatisfactory also from the viewpoint of hand.

Accordingly, it has been desired to develop a water and oil repellent composition having adequate durability without requiring any crosslinking agent or with an addition of a crosslinking agent in such a small amount as not to impair the hand.

The present inventors have conducted a detailed study on the mechanism of development of durability of the water and oil repellency and the hydrostatic head imparted to a fiber product and a method for reinforcing the water and oil repellency. As a result, it has been found that the durability of water and oil repellency can be remarkably improved, and the above problems can be solved, by treating the fiber product with an aqueous medium dispersion having a certain specific composition prepared by a certain specific method.

The present invention provides a water dispersion type water and oil repellent composition obtained by polymerizing the following polymerizable monomer mixture (b) in the presence of a compound (a) having a blocked isocyanate group and no polymerizable unsaturated group:

(b) a mixture comprising a polymerizable monomer having a polyfluoroalkyl group and a polymerizable monomer having no polyfluoroalkyl group.

The mechanism of how the water and oil repellency excellent in the durability is imparted to an object treated with the water dispersion type water and oil repellent composition of the present invention is not clearly understood. However, it is considered that the compound (a) and a polymer formed from the polymerizable monomer mixture (b) will form composite particles, whereby as compared with a case where the polymer is subsequently added to the compound (a), self crosslinking of the compound (a) uniformly present even in the interior of the particles, crosslinking with the polymer formed from the polymerizable monomer mixture (b) and crosslinking with fibers, will proceed uniformly, and a firm coating film can readily be formed on the surface of the treated object.

The compound (a) is a compound having a blocked isocyanate group and no polymerizable unsaturated group, which is one having an isocyanate group moiety of an isocyanate group-containing compound blocked with a blocking agent.

Such an isocyanate group-containing compound may, for example, be tolylene diisocyanate, diphenylmethane diisocyanate, naphthalene-1,5-diisocyanate, xylylene diisocyanate, hexamethylene diisocyanate, 4,4-dicyclohexylmethane diisocyanate, norbornane diisocyanate, isophorone diisocyanate, an adduct, an allophanate modified product, a biuret modified product, an isocyanurate modified product or a carbodiimide modified product of the foregoing compounds, or a urethane prepolymer.

The blocking agent may, for example, be an oxime such as acetone oxime or methyl ethyl. ketoxime, an alcohol such as 2-ethylhexanol, 2-methoxy-1-propanol or 3-methyl-2-penten-4-yne-1-ol, a phenol such as phenol or 2,4-dimethylphenol, a lactam such as ε-caprolactam or pyrrolidinone, an N-hydroxyphthalimide such as N-hydroxysuccinimide or N-hydroxyphthalimide, imidazole, or ethyl acetoacetate.

The compound (a) is preferably a non-yellowing type isocyanate such as hexamethylene diisocyanate or isophorone diisocyanate, or its modified product such as oxime or lactam blocked product. Specifically, it may, for example, be a methyl ketoxime blocked product as an isocyanurate modified product of hexamethylene diisocyanate or isophorone diisocyanate "Takenate (WB-70, WB-920 or XWB-72-Z-56), tradename, manufactured by Takeda Chemical Industries, Ltd.", "Elastron (BN-08 or BN-11), tradename, manufactured by Daiichi Kogyo Seiyaku K.K.".

The polymerizable monomer mixture (b) comprises a polymerizable monomer having a $R^f$ group (hereinafter referred to also as "a $R^f$ group-containing monomer") and a polymerizable monomer having no $R^f$ group (hereinafter referred to also as a $R^f$ group-non-containing monomer), as essential components.

The $R^f$ group-containing monomer has a $R^f$ group and a polymerizable unsaturated group.

The $R^f$ group is a group having at least two hydrogen atoms of an alkyl group substituted by fluorine atoms. The carbon number of the $R^f$ group is preferably from 4 to 20, more preferably from 6 to 16, most preferably from 9 to 12.

The $R^f$ group may have a straight chain structure or a branched chain structure. In the case of a branched chain structure, it is preferred that the branched moiety is present in the vicinity of the terminal end of the $R^f$ group, and the branched moiety is a short chain having from 1 to 4 carbon atoms. Further, the $R^f$ group may have an etheric oxygen atom between carbons of a carbon-carbon bond. The $R^f$ group may contain a halogen atom other than a fluorine atom, and the halogen atom other than the fluorine atom is preferably a chlorine atom.

The number of the fluorine atoms in the $R^f$ group is at least 60%, particularly preferably at least 80%, when it is represented by the formula of [(number of fluorine atoms in the $R^f$ group)/(number of hydrogen atoms contained in an alkyl group having the same carbon number as in the $R^f$ group)]× 100(%). Further, the $R^f$ group is preferably a group having all hydrogen atoms in an alkyl group substituted by fluorine atoms, i.e. a perfluoroalkyl group of the formula $C_mF_{2m+1}$—, wherein m is an integer of from 4 to 20 (hereinafter referred to as a $R^f$ group). Particularly preferred is a linear $R^f$ group wherein the average of m is from 9 to 12.

If m is too large, the $R^f$ group-containing monomer is solid at room temperature, as a high sublimation property and is difficult to handle. On the other hand, if m is too small, the water and oil repellency tends to be low, and the desired functions may not be obtained.

In the $R^f$ group-containing monomer, the $R^f$ group and the polymerizable unsaturated group may be bonded directly or indirectly via a connecting group, and they are preferably indirectly bonded. Particularly preferred is a compound of a structure wherein one $R^f$ group is connected to a polymerizable unsaturated group via a bivalent connecting group. The bivalent connecting group may, for example, be an alkylene group, an ester bond, an amide bond, an imino bond, a urethane bond, an etheric oxygen atom, a phenylene oxy group, a sulfonyl group, or a connecting group containing such a structure.

As the $R^f$ group-containing monomer, a known compound may be employed, and it can readily be synthesized from a $R^f$ group-containing alcohol, a $R^f$ group-containing carboxylic acid or a $R^f$ group-containing sulfonic acid.

The $R^f$ group-containing monomer is preferably a compound represented by the following Formula 1.

$$R^f\text{—}R^1\text{—}X \quad (1)$$

In the Formula 1, $R^f$ represents the $R^f$ group, $R^1$ represents a single bond or a bivalent connecting group, and X represents a monovalent organic group having a polymerizable unsaturated group. The $R^f$ group is preferably a group disclosed in the following specific examples and Examples.

$R^1$ may, for example, be —$(CH_2)_{n+p}$—, —$(CH_2)_n$COONR'$(CH_2)_p$—, —$(CH_2)_n$CONR'$(CH_2)_p$—, —$(CH_2)_n$SO$_2$NR'$(CH_2)_p$— or —$(CH_2)_n$NHCONR'$(CH_2)_p$—. Here, R' represents a $C_{1-4}$ alkyl group or a hydrogen atom, each of n and p is an integer of at least 0, provided that n+p is an integer of from 2 to 22.

Among them, $R^1$ is preferably —$(CH_2)_{n+p}$—, —$(CH_2)_n$CONR'$(CH_2)_p$—, or —$(CH_2)_n$SO$_2$NR'$(CH_2)_p$—, wherein p is an integer of at least 2, provided that n+p is from 2 to 6. Particularly preferred is —$(CH_2)_{n+p}$— wherein n+p is from 2 to 6, i.e. from a dimethylene group to a hexamethylene group.

X may, for example, be a residue of an olefin, a residue of a vinyl ether, a residue of a vinyl ester, a residue of a (meth)acrylate or a residue of a styrene. In this specification, acrylate and methacrylate are generally referred to as (meth) acrylate, and the same applies to e.g. (meth)acrylamide.

Preferably a residue of an olefin is —CR=CH$_2$, the residue of a vinyl ether is —OCR=CH$_2$, the residue of a vinyl ester is —COOCR=CH$_2$, the residue of a (meth) acrylate is —OCOR=CH$_2$, and the residue of a styrene is —Ph—CH=CH$_2$, —O—Ph—CH=CH$_2$ or —OCH$_2$—Ph—CR=CH$_2$. Here, R is a hydrogen atom, a methyl group or a halogen atom, and Ph is a phenylene group.

X is preferably a residue of a (meth)acrylate, particularly preferably —OCOCR=CH$_2$ wherein R is a hydrogen atom or a methyl group, i.e. a (meth)acryloxy group.

Such $R^f$ group-containing monomers may be used alone or in combination as a mixture of two or more having different carbon numbers in the respective $R^f$ groups. In a usual case, at least two $R^f$ group-containing monomers having different carbon numbers in the respective $R^f$ groups, are used in combination. Specific examples of the $R^f$ group-containing monomers will be given below, but monomers useful in the present invention are not limited to such specific examples.

$F(CF_2)_{10}(CH_2)_2OCOCH=CH_2$,
$F(CF_2)_{10}(CH_2)_3OCOCH=CH_2$,
$F(CF_2)_{10}(CH_2)_2OCOC(CH_3)C=CH_2$,
$F(CF_2)_{10}(CH_2)_{11}OCOCH=CH_2$,
$F(CF_2)_{10}(CF_2)_2(CH_2)_2OCOCH=CH_2$,
$F(CF_2)_{10}CH_2COOCH=CH_2$,
$F(CF_2)_{10}(CH_2)_2COOCH=CH_2$,
$F(CF_2)_{10}CONH(CH_2)_2CH=CH_2$,
$F(CF_2)_{10}CONH(CH_2)_5OCOCH=CH_2$,
$(CF_3)_2CF(CF_2)_6(CH_2)_2OCOCH=CH_2$,
$Cl(CF_2)_{10}(CH_2)_3OCOCH=CH_2$,
$H(CF_2)_{10}(CH_2)_2OCOCH=CH_2$,
$H(CF_2)_{10}CH=CH_2$,
$F(CF_2)_8(CH_2)_2OCH=CH_2$,
$F(CF_2)_8CH_2CF_2CH_2CH_2OCOCH=CH_2$,
$F(CF_2)_8(CH_2)_4OCOCH=CH_2$,
$F(CF_2)_8CONH(CH_2)_3CH=CH_2$,
$F(CF_2)_8(CH_2)_2OCH_2PhCH=CH_2$,
$F(CF_2)_8(CH_2)_2OCH_2PhCH_2CH_2OCOCH=CH_2$,
$F(CF_2)_8SO_2N(C_3H_7)C_2H_4OCOCH=CH_2$,
$F(CF_2)_{14}SO_2NH(CH_2)_2CH=CH_2$,
$F(CF_2)_{14}(CH_2)_6OCOC(CH_3)=CH_2$,

As the $R^f$ group-containing monomer, a $R^f$ group-containing (meth)acrylate, a $R^f$ group-containing styrene, a $R^f$ group-containing vinyl ester or a $R^f$ group-containing fumarate is, for example, preferred. A $R^f$ group-containing (meth)acrylate is particularly preferred from the viewpoint of the polymerizability with other monomers, the flexibility of the coating film formed on fibers, the bonding property to e.g. a fiber product, a wide application, the solubility in a solvent and efficiency in emulsion polymerization.

For the development of the water and oil repellency, the proportion of the $R^f$ group-containing monomer in the polymerizable monomer mixture (b) is preferably from 50 to 100 wt %, more preferably from 65 to 99 wt %.

The $R^f$ group-non-containing monomer is not particularly limited so long as it is a compound polymerizable with the above $R^f$ group-containing monomer and having at least one polymerizable unsaturated group and no $R^f$ group. Such $R^f$ group-non-containing monomers may be used alone or in combination as a mixture of two or more of them at optional proportions.

As a $R^f$ group-non-containing monomer containing one unsaturated group, a (meth)acrylate, a (meth)acrylamide, an olefin, a vinyl ether, a vinyl ester, a fumarate or a maleate may, for example, be mentioned.

As such a $R^f$ group-non-containing monomer, an olefinic hydrocarbon having a halogen atom, or a compound having a saturated hydrocarbon group, is preferred.

As the olefinic hydrocarbon having a halogen atom, an olefinic hydrocarbon having a chlorine atom or a fluorine atom, is preferred, and particularly preferred is a vinyl compound having a chlorine atom or a fluorine atom.

When the $R^f$ group-non-containing monomer is a compound having a saturated hydrocarbon group, the saturated hydrocarbon group is preferably a saturated long chain hydrocarbon group, more preferably one having at least 8 carbon atoms, most preferably one having from 8 to 24 carbon atoms. Further, the saturated hydrocarbon group may be of a linear, branched or cyclic structure, but a linear structure is preferred. As the saturated linear hydrocarbon group, an alkyl group is preferred. When a monomer having a saturated long chain hydrocarbon group is used as the $R^f$ group-non-containing monomer, a $R^f$ group-non-containing monomer having a saturated short chain hydrocarbon group, wherein the carbon number of the hydrocarbon group is from about 1 to 3, may be used in combination. However, a $R^f$ group-non-containing monomer having such a saturated short chain hydrocarbon group tends to lower the water repellency, and it can not be used in a high proportion.

Use of the $R^f$ group-non-containing monomer having a saturated linear hydrocarbon group wherein the carbon number of the saturated linear hydrocarbon group is from 8 to 24, provides an effect of making the handling of the treated cloth to be soft and an effect of improving the performance against abrasion. Further, a $R^f$ group-non-containing monomer having a saturated cyclic hydrocarbon group wherein the carbon number of the saturated cyclic hydrocarbon group is from 5 to 10, is also preferred, as it improves the durability against abrasion.

As the $R^f$ group-non-containing monomer having a saturated long chain hydrocarbon group, a (meth)acrylate having a saturated linear monovalent hydrocarbon group wherein the carbon number of the linear monovalent hydrocarbon group is from 14 to 20, is preferred.

The $R^f$ group-non-containing monomer may have a benzene ring, and is preferably a (meth)acrylate having a benzene ring. Further, the benzene ring may have a substituent. As the (meth)acrylate having a benzene ring, phenyl (meth)acrylate or benzyl (meth)acrylate is, for example, preferred.

The $R^f$ group-non-containing monomer may contain a reactive monomer having a reactive group in its molecule. Such a reactive group may, for example, be a functional group reactive with an isocyanate group, such as an amino group, a hydroxyl group or a carbamoyl group, an epoxy group, a halogen atom, a blocked isocyanate group, an alkoxy silyl group, a hydroxy silyl group, an N-methylol group, an N-alkyl oxy group or an imino group. The reactive monomer improves the bonding property to the fiber surface at the time of treating fibers, or forms a firm coating film by a reaction with the compound (a) to prevent detachment of the water and oil repellent during washing or dry cleaning.

As the $R^f$ group-non-containing monomer, a monomer having at least two polymerizable unsaturated groups, may be employed. The polymerizable unsaturated groups in the monomer having at least two polymerizable unsaturated groups, are preferably unsaturated groups contained in the above-mentioned $R^f$ group-non-containing monomer containing one unsaturated group. The monomer having at least two polymerizable unsaturated groups, is preferably an α,ω-diolefin, a divinylbenzene, a divinylether or a poly(meth)acrylate of a polyhydric alcohol. Particularly preferred is a divinylbenzene or a (meth)acrylate of a polyhydric alcohol, from the viewpoint of the copolymerizability with the $R^f$ group-containing monomer.

The polyhydric alcohol for forming the (meth)acrylate, may, for example, be ethylene glycol, propylene glycol, a butane diol, a pentane diol, neopentyl glycol, a hexane diol, a nonane diol, a benzene dimethanol, bisphenol A, trimethylolpropane, glycerol, pentaerythritol, dipentaerythritol, dimethylolcyclohexane, or modified products of such alcohols. Further, a high molecular polyhydric alcohol obtained by ring-opening polymerization of ethylene oxide and/or propylene oxide with an optional initiator, may also be mentioned.

The proportion of the $R^f$ group-non-containing monomer in the polymerizable monomer mixture (b) is preferably from 0 to 50 wt %, more preferably from 1 to 35 wt %. In a case where the $R^f$ group-non-containing monomer has a short chain aliphatic hydrocarbon group having not more than 11 carbon atoms, its proportion in the polymerizable monomer mixture (b) is preferably 20 wt %. In a case where the $R^f$ group-non-containing monomer has at least two unsaturated groups, its content in the polymerizable monomer mixture (b) is preferably at most 10 wt %.

Now, specific examples of the $R^f$ group-non-containing monomer will be presented, but the useful monomers are not limited thereto.

Olefins such as ethylene, propylene, vinyl chloride, vinylidene chloride, vinyl fluoride, vinylidene fluoride, chlorotrifluoroethylene, butadiene, isoprene and chloroprene.

(Meth)acrylates such as methyl (meth)acrylate, ethyl (meth)acrylate, n-propyl (meth)acrylate, isopropyl (meth)acrylate, n-butyl (meth)acrylate, isobutyl (meth)acrylate, sec-butyl (meth)acrylate, tert-butyl (meth)acrylate, hexadecyl (meth)acrylate, octadecyl (meth)acrylate, behenyl (meth)acrylate, benzyl (meth)acrylate, glycidyl (meth)acrylate, aziridinylethyl (meth)acrylate, hydroxyethyl (meth)acrylate, hydroxypropyl (meth)acrylate, hydroxybutyl (meth)acrylate, tetrahydrofurfuryl (meth)acrylate, (meth)acrylates having organopolysiloxane, and (2-dimethylamino)ethyl (meth)acrylate.

(Meth)acrylamides such as diacetone (meth)acrylamide, N-methylol (meth)acrylamide and (meth)acrylamide.

Imides such as maleimide and N-methylmaleimide.

Vinylesters such as vinyl acetate, vinyl pivaliate, vinyl dodecanoate and vinyl octadecanoate.

Acrylonitrile, styrene, α-methylstyrene, p-methylstyrene, halogenated alkylvinyl ether, vinylalkyl ketone, triallyl cyanurate, allylglycidyl ether, ally acetate, or N-vinylcarbazole.

Mono(meth)acrylate of polyoxyethylenediol, mono(meth)acrylate of polyoxypropylenediol, mono(meth)acrylate of poly(oxypropyleneoxyethylene)diol, or mono(meth)acrylate of poly(oxyethyleneoxybutylene)diol, wherein the number of oxyalkylene units is from 3 to 12.

A mono(meth)acrylate of a polyesterdiol obtained by adding lactone to a (meth)acrylate having a hydroxyl group, wherein the number of lactone-ring opened units is from 2 to 50, or a mono(meth)acrylate of a polylactone diol, particularly such a mono(meth)acrylate of a polyester diol, wherein the lactone is ε-caprolactone, or a mono(meth)acrylate of a poly(ε-caprolactone)diol.

The composition of the present invention can be produced by a method of dispersing the compound (a) and the polymerizable monomer mixture (b) in the presence of an aqueous medium to polymerize the polymerizable monomer mixture (b), or by a method of adding the polymerizable monomer mixture (b) to an aqueous medium dispersion of the compound (a) for polymerization. It is preferred to polymerize the polymerizable monomer mixture (b) in the presence of the compound (a) in an amount of from 0.01 to 0.5 time by weight relative to the polymerizable monomer mixture (b). If the amount of the compound (a) is small, the durability tends to be inadequate, and if it is too large, the hand of the fiber product tends to be impaired.

As a method for dispersing the compound (a) and the polymerizable monomer mixture (b) in an aqueous medium, a method of forcibly emulsifying them by means of an emulsifier, or a method of employing a self-dispersible compound as the compound (a), may be employed.

The emulsifier is not particularly limited, and at least one of nonionic, cationic, anionic and amphoteric emulsifiers, may be employed. The amount of the emulsifier is preferably from 0.5 to 20 parts by weight, per 100 parts by weight of the total amount of the compound (a) and the polymerizable monomer mixture (b), particularly preferably from 1 to 10 parts by weight, from the viewpoint of the water and oil repellency and the stability of dispersibility.

Specific examples of the emulsifier will be given below, but the useful emulsifier is not limited thereto. In the following examples of the emulsifier, the alkyl group moiety such as an octadecyl group may be an alkenyl group moiety such as an oleyl group.

The nonionic emulsifier may, for example, be an alkylphenylpolyoxyethylene, an alkylpolyoxyethylene, an alkylpolyoxyalkylenepolyoxyethylene, a fatty acid ester, an alkylaminepolyoxyethylene, an alkylamidepolyoxyethylene, an alkylaminepoly (oxyethyleneoxypropylene), or an alkylamineoxide.

The alkylphenylpolyoxyethylene may, for example, be nonylphenylpolyoxyethylene or octylphenylpolyoxyethylene.

The alkylpolyoxyethylene may, for example, be one wherein the alkyl group is a $C_{4-26}$ saturated aliphatic group, which is linear or branched, such as an octyl group, a dodecyl group, a tetradecyl group, a hexadecyl group, an octadecyl group, a behenyl group or a secondary alkyl group.

The alkylpolyoxyalkylenepolyoxyethylene may, for example, be an alkylpolyoxypropylenepolyoxyethylene or an alkylpolyoxybutylenepolyoxyethylene, wherein the alkyl moiety may be a $C_{4-26}$ saturated aliphatic group, which is linear or branched, such as an octyl group, a dodecyl group, a tetradecyl group, a hexadecyl group, an octadecyl group, a behenyl group or a secondary alkyl group.

The cationic emulsifier may, for example, be an amine salt, a quaternary ammonium salt, an oxyethylene-addition type ammonium hydrochloride, and specifically, it may, for example, be a trimethylalkylammonium hydrochloride, a dimethyldialkylammonium hydrochloride, a monoalkylamide acetate, or an alkylmethyldipolyoxyethyleneammonium hydrochloride. The alkyl group may, for example, be a $C_{4-26}$ saturated aliphatic group, such as an octyl group, a dodecyl group, a tetradecyl group, a hexadecyl group, an octadecyl group or a behenyl group.

The anionic emulsifier may, for example, be a fatty acid salt, an α-olefin sulfonate, an alkylbenzene sulfonic acid or its salt, an alkyl sulfate, an alkylether sulfate, an alkylphenylether sulfate, a methyltaurine salt or an alkyl sulfosuccinate.

The amphoteric emulsifier may, for example, be an alanine, an imidazoliniumbetaine, an amidebetaine, or betaine acetate, and it may specifically be, for example, dodecyl betaine, octadecyl betaine, dodecylcarboxymethylhydroxyethylimidezoliniumbetaine, betaine dodecyldimethylaminoacetate, or betaine fatty acid amidepropyldimethylaminoacetate.

As a method for making the compound (a) self-dispersible, a method of using a hydrophilic compound such as a sulfate, a polyol or a polyethyleneglycol, as a blocking agent or a chain extender, may be mentioned.

The polymerization medium is preferably an aqueous medium including water, and the aqueous medium may contain an organic solvent, as the case requires. As such an organic solvent, a water soluble organic solvent is preferred, such as an ester type, ketone-type, ether-type or glycol-type organic solvent. The ratio of the water to the organic solvent is not particularly limited. As the organic solvent, the following may be mentioned as examples.

Acetone, ethylene glycol monoethyl ether acetate, ethylene glycol monoethyl ether, ethylene glycol monomethyl ether, ethylene glycol monobutyl ether, propylene glycol monomethyl ether, propylene glycol monomethyl ether acetate, dipropylene glycol monomethyl ether, tripropylene glycol monomethyl ether, propylene glycol monobutyl ether, ethyl 3-ethoxypropionate, 3-methoxy-3-methyl-1-butanol, 2-tert-butylethanol, isopropylalcohol, n-butylalcohol, isobutylalcohol, ethylalcohol, ethyleneglycol, propyleneglycol, dipropyleneglycol and tripropyleneglycol.

The method for initiating the polymerization is not particularly limited, but it is preferred to use a water-soluble or oil-soluble polymerization initiator. An initiator which is commonly used, such as an azo type, peroxide type or redox type initiator be employed depending upon the polymerization temperature. As the polymerization initiator, a water-soluble initiator is particularly preferred.

The polymerization temperature is not particularly limited, but it is preferably from 20 to 150° C.

Further, in the polymerization reaction, a chain transfer agent may be used for the purpose of controlling the molecular weight. As such a chain transfer agent, an aromatic compound or a mercaptan is preferred, and an alkylmercaptan is particularly preferred. Specifically, n-octylmercaptan, n-dodecylmercaptan, 2,4,6-trimethylnonane-2-thiol, or n-octadecylmercaptan may be mentioned. Further, α-methylstyrenedimer is also preferred.

As a stage prior to initiation of the polymerization, water, the compound (a) and the polymerizable monomer mixture (b) may preliminarily be dispersed by e.g. a homomixer or a high pressure emulsifying machine. By thorough dispersion prior to the initiation of the polymerization, it is possible to improve the yield of the finally obtainable polymer.

The dispersion polymerized by the above method is preferably present in the form of particles. The particle size is preferably from 0.001 to 1 μm, more preferably from 0.01 to 1 μm. If the particle size is too small, a large amount of an emulsifier will be required in order to obtain a stable dispersion, whereby the water and oil repellency tends to be low, and further, when it is applied to a dyed cloth, color fading is likely to result, such being undesirable. If the particle size is larger than 1 μm, the particles are likely to sediment in the medium, such being undesirable. The particle size can be measured by e.g. a dynamic light scattering apparatus or an electron microscope. When the polymerization is carried out by the usual emulsion polymerization method, the average particle size will be within the above range.

As the medium for the water dispersion type water and oil repellent composition of the present invention, water or an aqueous medium comprising water and an organic solvent, is preferred. In the case where an organic solvent is employed, the amount of the organic solvent is preferably from 0 to 50 parts by weight, per 100 parts by weight of the total amount of the compound (a) and the polymer formed from the polymerizable monomer mixture (b). Further, the amount of the compound (a) and the polymer formed from the polymerizable monomer mixture (b), is preferably from 0.01 to 50 parts by weight, per 100 parts by weight of the medium, and it is preferred to adjust the concentration to be within such a range, with the medium. Further, the concentration may suitably be changed depending upon the particular purpose or formulation of the composition.

The water dispersion type water and oil repellent composition of the present invention may be applied to an object to be treated by an optional method depending upon the type of the object to be treated or the formulation of the composition. For example, a method may be employed wherein it is applied to the surface of the object to be treated by a coating method such as dip coating, followed by drying.

To the water dispersion type water-oil repellent composition of the present invention, other additive components may be incorporated. For example, other water repellents, oil repellents, crosslinking agents, insecticides, flame retardants, antistatic agents or anticrease agents may, optionally be incorporated.

The object to be treated with the water dispersion type water and oil repellent composition of the present invention may, for example, be fiber products made of e.g. natural fibers, synthetic fibers and mixed fibers thereof, and it may also be an article made a metal, glass or resin, where durability of water and oil repellency is required.

Now, the present invention will be described in further detail with reference to Examples. However, it should be understood that the present invention is by no means restricted by such specific Examples. Examples 1 to 4 are Preparation Examples of dispersions, Examples 5 to 7 and 11 are Working Examples of the present invention, and Examples 8 to 10 are Comparative Examples.

EXAMPLE 1

101 g (0.2 mol) of hexamethylene diisocyanate trimer, 0.3 g of dibutyltin laurate and 35 g of methyl isobutyl ketone, were charged into a 1 l flask equipped with a stirrer, a dropping funnel, a thermometer and a condenser. While maintaining the temperature at 60° C., 52.3 g (0.6 mol) of methyl ethyl ketoxime was dropwise added thereto, and the mixture was stirred for further 3 hours, whereupon the IR spectrum was measured to confirm disappearance of the peak attributable to an isocyanate group.

After cooling to room temperature, 400 g of deionized water and 15.4 g of polyoxyethyleneoleyl ether were added thereto, and the mixture was stirred for dispersion and further emulsified and dispersed by a high pressure homogenizer. Thereafter, the solvent was distilled off under reduced pressure to obtain a dispersion having a solid content of 40% (dispersion A).

EXAMPLE 2

133 g (0.2 mol) of isophorone diisocyanate trimer, 0.3 g of dibutyltin laurate and 35 g of methyl isobutyl ketone, were charged into a 1 l flask equipped with a stirrer, a dropping funnel, a thermometer and a condenser. While maintaining the temperature at 60° C., 52.3 g (0.6 mol) of methyl ethyl ketoxime was dropwise added thereto, and the mixture was stirred for further 3 hours, whereupon the IR spectrum was measured to confirm disappearance of the peak attributable to an isocyanate group.

After cooling to room temperature, 400 g of deionized water, 13.8 g of polyoxyethyleneoleyl ether and 1.5 g of octadecyltrimethylammonium chloride were added thereto, and the mixture was stirred for dispersion and further emulsified and dispersed by a high pressure homogenizer. Thereafter, the solvent was distilled off under reduced pressure to obtain a dispersion having a solid content of 40% (dispersion B).

EXAMPLE 3

Into a 1 l beaker, 179 g (70 parts) of a perfluoroalkylethyl acrylate ($CmF_{2m+1}CH_2CH_2OCOCH=CH_2$, where m is a mixture of 6, 8, 10, 12, 14 and 16, and the average of m is 9, hereinafter referred to as FA), 15.3 g (5.9 parts) of dioctyl maleate (hereinafter referred to as DOM), 3.4 g (1.3 parts) of N,N-dimethylacrylamide (hereinafter referred to as DAA), 4.7 g (1.8 parts) of a methylethylketoxime blocked product of 2-isocyanate ethyl methacrylate (hereinafter referred to as BMOI), 7.8 g (3 parts) of 2-hydroxyethyl acrylate (hereinafter referred to as HEA), 2.6 g of n-dodecylmercaptan, 13 g of polyoxyethyleneoleyl ether, 408 g of deionized water and 13 g of dipropylene glycol, were charged and preliminarily dispersed by a homomixer and then treated at 400 kg/cm by means of a high pressure emulsifying machine, to obtain a dispersion.

This dispersion was put into a 1 l stainless steel autoclave, which was flushed with nitrogen. 49.3 g (19 parts) of a vinyl chloride monomer was added thereto, and then, 2.3 g of an acetate of VA-061 (an azo type initiator, manufactured by Wako Jyunyaku K.K.) was added thereto. The temperature was raised to 50° C., and then polymerization was carried out for 12 hours to obtain a dispersion having a solid content of 37.0% and an average particle size of 0.10 μm (660 g). Deionized water was added to the aqueous medium dispersion thus obtained, to adjust the solid content concentration to 20 wt % (dispersion C).

EXAMPLE 4

Into a 1 l beaker, 153 g (60 parts) of FA, 90 g (35.2 parts) of octadecyl acrylate, 14.7 g (1.8 parts) of BMOI, 7.8 g (3 parts) of HEA, 11.7 g of polyoxyethyleneoleyl ether, 1.3 g of octadecyltrimethylammonium chloride, 2.6 g of n-dodecylmercaptan, 408 g of deionized water and 13 g of dipropylene glycol, were charged, and preliminarily dispersed by a homomixer, and then treated at 400 kg/cm by means of a high pressure emulsifying machine, to obtain a dispersion.

This dispersion was put into a 1 l stainless steel autoclave, which was then flushed with nitrogen. 2.3 g of an acetate of VA-061 (an azo type initiator, manufactured by Wako Jyunyaku K.K.) was added thereto. The temperature was raised to 50° C., and polymerization was carried out for 12 hours to obtain a dispersion having a solid content of 37.0% and an average particle size of 0.13 μm (650 g). Deionized water was added to the aqueous medium dispersion thus obtained, to adjust the solid content concentration to 20 wt % (dispersion D).

Preparation of Treated Cloth 288 g of deionized water was added to 12 g of an aqueous medium dispersion (20%) to prepare a treating liquid. As a test cloth, a nylon cloth was used, and it was dipped in the treating liquid and then squeezed by a pair of rubber rollers so that the wet pick up was 60 wt %. Then, it was dried at 110° C. for 90 seconds and further subjected to heat treatment at 170° C. for 60 seconds. With respect to the obtained treated cloth, washing of 80 times (JIS L0217, appendix 103) was carried out, followed by natural drying.

Evaluation of Oil Repellency

The evaluation was carried out in accordance with AATCC-TM118-1966, and the oil repellency was represented by the oil repellency grade as shown in Table 1. Symbol performance +(−) attached to an oil repellency grade means that the was slightly better (worse) than the grade.

TABLE 1

| Oil repellency grade | Test liquid | Surface tension (25° C.) |
|---|---|---|
| 8 | n-heptane | 20.0 dyn/cm |
| 7 | n-octane | 21.8 dyn/cm |
| 6 | n-decane | 23.5 dyn/cm |
| 5 | n-dodecane | 25.0 dyn/cm |
| 4 | n-tetradecane | 26.7 dyn/cm |
| 3 | n-hexadecane | 27.3 dyn/cm |
| 2 | 65 parts of nujol/35 parts of hexadecane | 29.6 dyn/cm |
| 1 | nujol | 31.2 dyn/cm |
| 0 | Less than 1 | |

Evaluation A of Water Repellency

The evaluation was carried out by a spray test in accordance with JIS L1092-1986 5.2, and the water repellency was represented by the water repellency grade as shown in Table 2. The symbol +(−) attached to a water repellency grade means that the performance was slightly better (worse) than the particular grade.

Evaluation B of Water Repellency

The evaluation was carried out by a Bundesmann method in accordance with JIS L1092-1986 reference test method C (DIN method), and the water repellency was represented by the water repellency grade as shown in Table 2.

TABLE 2

| Water repellency grade | State |
|---|---|
| 100 | No wetting observed on the surface |
| 90 | Slight wetting observed on the surface |
| 80 | Partial wetting observed on the surface |
| 70 | Substantial wetting observed on the surface |
| 50 | Wetting observed over the entire surface |
| 0 | Complete wetting observed over surfaces |

Evaluation of Hand

The evaluation was in accordance with AATCC Evaluation Procedure 5.

EXAMPLE 5

Into a 1 l beaker, 32.5 g of dispersion A, 179 g (70 parts) of FA, 15.3 g (5.9 parts) of DOM, 3.4 g (1.3 parts) of DAA, 4.7 g (1.8 parts) of BMOI, 7.8 g (3 parts) of HEA, 2.6 g of n-dodecylmercaptan, 13 g of polyoxyethyleneoleyl ether, 408 g of deionized water and 13 g of dipropylene glycol were charged, preliminarily dispersed by a homomixer and then treated at 400 kg/cm² by means of a high pressure emulsifying machine, to obtain a dispersion.

This dispersion was put into a 1 l stainless steel autoclave, which was flushed with nitrogen. 49.3 g (19 parts) of a vinyl chloride monomer was added thereto, and then 2.3 g of an acetate of VA-061 (azo type initiator, manufactured by Wako Jyunyaku K.K.) was added thereto. The temperature was raised to 50° C., and then polymerization was carried out for 12 hours to obtain a dispersion having a solid content of 36.5% and an average particle size of 0.18 μm (660 g). The average particle size was measured by a laser type light scattering method (using an apparatus manufactured by Otsuka Denshi K.K.). Water was added to the obtained dispersion to adjust the solid content concentration to 20 wt %. Using this aqueous medium dispersion, evaluations were carried out by the above described methods. The evaluation results are shown in Table 3.

EXAMPLE 6

Into a 1 l beaker, 32.5 g of dispersion A, 153 g (60 parts) of FA, 90 g (35.2 parts) of octadecyl acrylate, 14.7 g (1.8 parts) of BMOI, 7.8 g (3 parts) of HEA, 2.6 g of n-dodecylmercaptan, 408 g of deionized water and 13 g of propylene glycol were charged, preliminarily dispersed by a homomixer and then treated at 400 kg/cm² by means of a high pressure emulsifying machine, to obtain a dispersion.

This dispersion was put into a 1 l stainless steel autoclave, which was flushed with nitrogen, and 2.3 g of an acetate of VA-061 (azo type initiator, manufactured by Wako Jyunyaku K.K.) was added thereto. The temperature was raised to 50° C., and then, polymerization was carried out for 12 hours to obtain a dispersion having a solid content of 37.5% and an average particle size of 0.18 μm (650 g). Water was added to the obtained dispersion to adjust the solid content concentration to 20 wt %, and evaluations were carried out. The evaluation results are shown in Table 3.

EXAMPLE 7

Into a 1 l beaker, 32.5 g of dispersion B, 179 g (70 parts) of FA, 15.3 g (5.9 parts) of DOM, 3.4 g (1.3 parts) of DAA, 4.7 g (1.8 parts) of BMOI, 7.8 g (3 parts) of HEA, 2.6 g of n-dodecylmercaptan, 408 g of deionized water and 13 g of dipropylene glycol, were charged, preliminarily dispersed by a homomixer and then, treated at 400 kg/cm² by means of a high pressure emulsifying machine, to obtain a dispersion.

This dispersion was put into a 1 l stainless steel autoclave, which was flushed with nitrogen. 49.3 g (19 parts) of a vinyl chloride monomer was added thereto, and then, 2.3 g of an acetate of VA-061 (azo type initiator, manufactured by Wako Jyunyaku K.K.) was added thereto. The temperature was raised to 50° C., and then, the polymerization was carried out for 12 hours to obtain a dispersion having solid content of 36.7% and an average particle size of 0.19 μm (660 g). Water was added to the obtained dispersion to adjust the solid content concentration to 20 wt %, and evaluations were carried out. The evaluation results are shown in Table 3.

EXAMPLE 8

Dispersion A was diluted with water to bring the solid content to 20%, and it was mixed with dispersion C in a ratio of 1:1, and evaluations were carried out. The evaluation results are shown in Table 3.

EXAMPLE 9

Dispersion A was diluted with water to bring the solid content to 20%, and it was mixed with dispersion D in a ratio of 1:1, and evaluations were carried out. The evaluation results are shown in Table 3.

EXAMPLE 10

Dispersion B was diluted with water to bring the solid content to 20%, and it was mixed with dispersion C in a ratio of 1:1, and evaluations were carried out. The evaluation results are shown in Table 3.

EXAMPLE 11

Into a 1 l beaker, 32.5 g of a water dispersible blocked isocyanate (Takenate WB920, manufactured by Takeda Chemical Industries, Co., Ltd.), 179 g (70 parts) of FA, 15.3 g (5.9 parts) of DOM, 3.4 g (1.3 parts) of DAA, 4.7 g (1.8 parts) of poly(oxyethyleneoxypropylene)methacrylate (70PEP-350B, manufactured by Nippon Oil and Fat Co., Ltd.), 7.8 g (3 parts) of HEA, 2.6 g of n-dodecylmercaptan, 8 g of polyoxyethyleneoleyl ether, 408 g of deionized water and 13 g of dipropylene glycol, were charged, preliminarily dispersed by a homomixer and then, treated at 400 kg/cm$^2$ by means of a high pressure emulsifying machine, to obtain a dispersion.

This dispersion was put into a 1 l stainless steel autoclave, which was flushed with nitrogen. 49.3 g (19 parts) of a vinyl chloride monomer was added thereto, and 2.3 g of an acetate of VA-061 (azo type initiator, manufactured by Wako Jyunyaku K.K.) was added thereto. The temperature was raised to 50° C., and the polymerization was carried out for 12 hours to obtain a dispersion having a solid content of 36.5% and an average particle size of 0.17 μm (670 g). Water was added to the obtained dispersion, to adjust the solid content concentration to 20 wt %, and evaluations were carried out. The evaluation results are shown in Table 3.

TABLE 3

| Example No. | Oil repellency | Water repellency A | Water repellency B | Hand |
|---|---|---|---|---|
| 5 | 6 | 100 | 100 | Equal to non treated cloth |
| 6 | 6− | 100 | 90+ | Same as above |
| 7 | 6 | 100 | 100 | Same as above |
| 8 | 2 | 70 | 70− | Harder than non-treated cloth |
| 9 | 1 | 50 | 50− | Same as above |
| 10 | 2 | 70 | 70− | Same as above |
| 11 | 6 | 100 | 100 | Equal to non-treated cloth |

The water dispersion type water and oil repellent composition of the present invention has practical durability of the water and oil repellency, which has not heretofore been accomplished.

What is claimed is:

1. A water and oil repellent composition, obtained by polymerizing a polymerizable monomer mixture (b) in the presence of a compound (a) having a blocked isocyanate group and no polymerizable unsaturated group;
   wherein said composition is contained in a dispersion in water;
   wherein said monomer mixture (b) comprises:
   an unsaturated polymerizable monomer having a polyfluoroalkyl group R$^f$ and an unsaturated polymerizable monomer having no polyfluoroalkyl group;
   wherein said unsaturated polymerizable monomer having a polyfluoroalkyl group R$^f$ is represented by formula (1)

$$R^f\!-\!R^1\!-\!X \qquad (1);$$

wherein
   R$^f$=C$_n$H$_{2n+1}$, wherein at least two hydrogen atoms are substituted by fluorine and
wherein
   n=4–20;
   R$^1$=a single bond or a bivalent group; and
   X=unsaturated polymerizable group.

2. The water and oil repellent composition according to claim 1, wherein R$^1$ of formula (I) is a bivalent group selected from the group consisting of a —(CH$_2$)$_{n+p}$— group, a —(CH$_2$)$_n$COONR'(CH$_2$)$_p$— group, a —(CH$_2$)$_n$CONR'(CH$_2$)$_p$— group, a —(CH$_2$)$_n$SO$_2$NR'(CH$_2$)$_p$— group, and a —(CH$_2$)$_n$NHCONR'(CH$_2$)$_p$— group,
wherein
   R'=a C$_{1-4}$ alkyl group or a hydrogen atom; and
   n and p≧0, with
   n+p=2 to 22.

3. The water and oil repellent composition according to claim 1, wherein R$^1$ of formula (I) is a bivalent group selected from the group consisting of a —(CH$_2$)$_{n+p}$— group, a —(CH$_2$)$_n$CONR'(CH$_2$)$_p$— group, and a —(CH$_2$)$_n$SO$_2$NR'(CH$_2$)$_p$— group,
wherein
   p≧2, and
   n+p=2 to 6.

4. The water and oil repellant composition according to claim 1, wherein X of formula (I) is selected from the group consisting of an alkenyl group, vinyl ether group, vinyl ester group, a (meth)acryl group and a styryl group.

5. The water and oil repellent composition according to claim 1, wherein said compound (a) is selected from the group consisting of blocked tolylene diisocyanate, a blocked diphenyl methane diisocyanate, a blocked naphthalene-1,5-diisocyanate, a blocked xylylene diisocyanate, a blocked hexamethylene diisocyanate, a blocked 4,4-dicyclohexylmethane diisocyanate, a blocked norbornane diisocyanate, and a blocked isophorone diisocyanate.

6. The water and oil repellent composition according to claim 5, wherein said compound (a) is modified with allophanate, isocyanurate or carbodiimide.

7. The water and oil repellent composition according to claim 1, wherein said isocyanate group of said compound (a) is blocked with an oxime, an alcohol, a phenol, a lactam, a N-hydroxyphthalimide, a succinimide, an imidazole, or an ethylacetoacetate.

8. The water and oil repellent composition according to claim 7, wherein said oxime is acetone oxime or methyl ethyl ketoxime.

9. The water and oil repellent composition according to claim 7, wherein said alcohol is 2-ethyl-hexanol, 2-methoxy-1-propanol or 3-methyl-2-penten-4-yne-1-ol.

10. The water and oil repellent composition according to claim 7, wherein said phenol is phenol or 2,4-dimethylphenol.

11. The water and oil repellent composition according to claim 7, wherein said lactam is ε-caprolactam or pyrrolidinone.

12. The water and oil repellent composition according to claim 1, wherein an amount of said compound (a) is 0.01 to 0.5 times the weight of said monomer mixture (b).

13. The water and oil repellent composition according to claim 1, wherein said unsaturated polymerizable monomer having no polyfluoroalkyl group has a functional group which is reactive with an isocyanate group.

14. The water and oil repellent composition according to claim 13, wherein said functional group reactive with an isocyanate group is selected from the group consisting of an amino group, a hydroxyl group, and a carbamoyl group.

15. The water and oil repellent composition according to claim 1, wherein said unsaturated polymerizable monomer having no polyfluoroalkyl group has a functional group which reacts with said compound (a) or adheres to a surface of a fiber.

16. The water and oil repellent composition according to claim 15, wherein said functional group is selected from the group consisting of an epoxy group, a halogen atom, a blocked isocyanate group, an alkoxy silyl group, a hydroxy silyl group, an N-methylol group, an N-alkoxy group and an imino group.

17. The water and oil repellent composition according to claim 1, wherein an amount of said monomer having polyfluoroalkyl group $R^f$ is 65–99% by weight per 100% by weight of the monomer mixture (b).

18. The water and oil repellent composition according to claim 1, wherein an amount of said monomer having no polyfluoroalkyl group is 1–35% by weight per 100% by weight of the monomer mixture (b).

19. The water and oil repellent composition according to claim 1, wherein said monomer having no polyfluoroalkyl group is selected from the group consisting of a (meth)acrylate, a (meth)acrylamide, an olefin, a vinyl ether, a vinyl ester, a fumarate, a maleate, and mixtures thereof.

20. A fiber treated with the water and oil repellent composition according to claim 1.

* * * * *